July 5, 1960
L. K. DAWSON
2,943,387
PROCESS OF CIRCUMFERENTIALLY WELDING STEEL PIPE
Filed Oct. 24, 1957
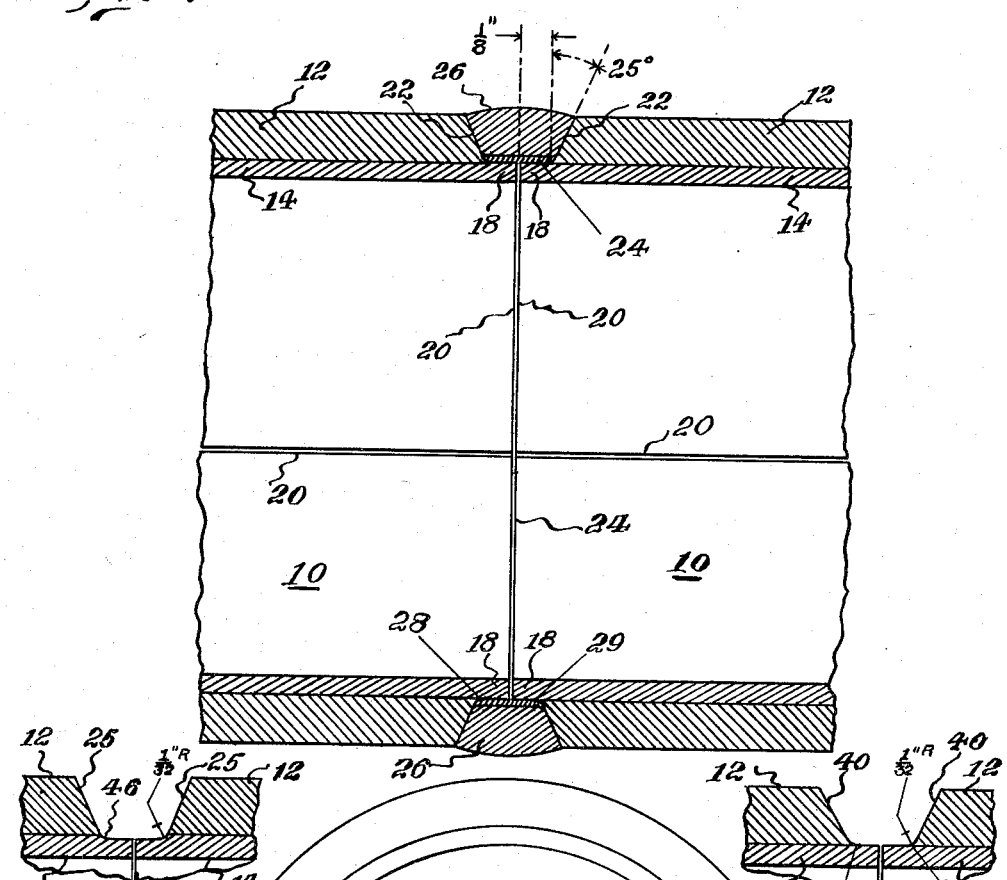
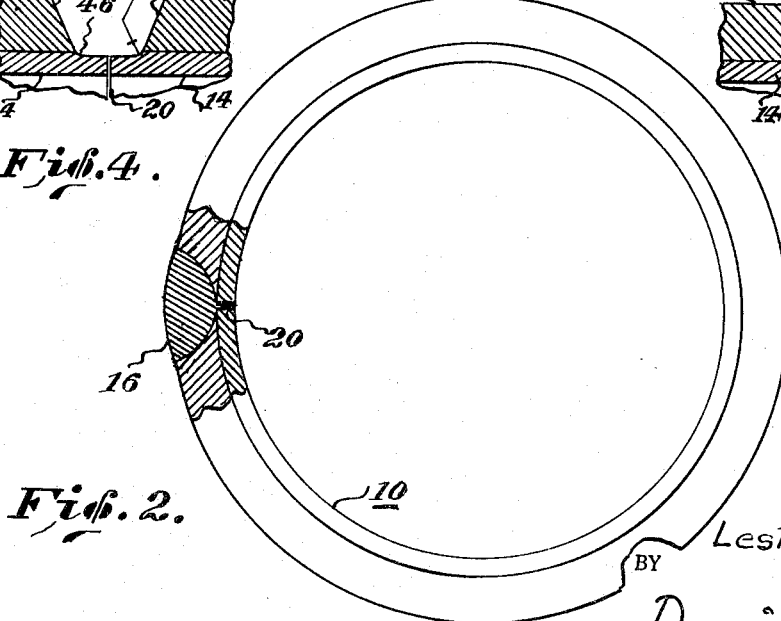
INVENTOR.
Lester K. Dawson.
BY
Daniel E. Ipo
Attorney.

20# United States Patent Office 2,943,387
Patented July 5, 1960

2,943,387
PROCESS OF CIRCUMFERENTIALLY WELDING STEEL PIPE

Lester K. Dawson, Coatesville, Pa., assignor to Lukens Steel Company, Coatesville, Pa., a corporation of Pennsylvania Filed Oct. 24, 1957, Ser. No. 692,219

2 Claims. (Cl. 29—471.1)

This invention relates to a circumferentially welded steel pipe and a method of producing such welded pipe.

The invention pertains to the production of a welded joint for pipes which are composed of an outside layer of carbon steel and an inside layer of cladding steel welded over its entire contacting surface to the layer of carbon steel. The cladding layer may be of any of the well known types of metal of the corrosion resisting type, such as nickel, stainless steel, chrome or nickel alloy steels that are used for this purpose.

An object of the invention is to provide a butt welded joint for corrosion resistive pipe or other circular structures which is at least as strong as the structures themselves and which joint is non-corrosive.

Another object is to provide a method of circumferentially welding pipe sections to each other wherein the pipe sections are of the type above specified, and wherein the welding operation is performed entirely from the outside thereof.

A further object is to provide, for one form of the invention, a pipe joint for clad steel pipe sections, and a method of making said joint.

Other objects will appear hereinafter throughout the specification.

In the drawings:

Figure 1 shows an enlarged or magnified vertical section, partly broken away, of one form of the invention;

Figure 2 is an end elevation of one of the pipe sections of Figure 1, with its longitudinal joint shown in section;

Figure 3 is a sectional view, partly broken away, similar to Figure 1, prior to the welding operation; and Figure 4 is a view similar to Figure 3 showing a modification thereof.

Referring to the construction illustrated in Figures 1 and 2, it has been indicated that in many of the process industries clad steel pipe with the cladding material forming the inside of the pipe, is a highly satisfactory construction both from the standpoint of performance and that of economy. However the fabrication, by the welding method presents problems which are not present in the usual applications of clad steel plate. For instance, the longitudinal butt weld of the pipe has required special fixtures and a very close control of heat input and welding speed, in order to obtain the desired physical properties of the welded joint of the clad pipe, and the necessary chemical properties in the weld alloy metal on the cladding side of the pipe. These problems have now been largely overcome. However, the circumferential joint of the cladding pipe sections presents other problems, particularly under field conditions which have been solved by the present invention.

In the making of butt-weld pipe joint up to 12" in diameter, it will be impossible for the welder to have access to the inside surface of the pipe. The joint at the inside surface is the most important from the standpoint of making a good weld joint, for if the joint is weak or otherwise insufficient around any of the inside portion of the joint, fluid within the pipe may find its way outside of the cladding surface backing steel which forms the outside layer. Such fluid, often highly corrosive in type, will quickly destroy the backing layer, thereby making it necessary to replace one or more sections of the pipe line.

In the making of circumferential joints in such cases where the pipe sections are composed entirely of metal that is non-corrosive in character, the joints must be of the same or substantially the same composition as the pipe sections themselves. Preferably, however, the joints should exhibit non-corrosive characteristics that are even higher than the non-corrosive characteristics of the pipe sections themselves. For instance, assuming that the pipe sections are of nickel steel, the welding composition should contain a higher proportion of nickel than the pipe sections. In each case it is preferable that the composition of the welding alloy composition exceed in its non-corrosive characteristics those of the compositions of the pipe sections which are to be joined together.

Referring now to Figures 1 and 2 which disclose the preferred form of the invention, 10 shows pipe sections as a whole. These consist of an outer layer 12 of base metal, such as carbon steel, to which is bonded by welding over the entire contacting surfaces thereof, the cladding sheet or layer 14 which forms the lining for the pipe. The cladding sheet may be composed of stainless steel, nickel, chrome or alloys thereof, or other corrosion resisting metal. Such cladding layer therefore may be composed of any of the materials which are practiced in the art, the particular material of the cladding layer forming no part of the present invention.

Preferably the pipe sections are made from composite sheets which have been shaped by bending to form the pipe sections to proper shape, after which one or more longitudinal butt-welds 16 are laid to join the longitudinal side edges to each other as indicated at 20. The longitudinal weld or welds may require special fixtures and a very close control of heat input and welding speed in order to obtain the desired physical properties across the welded joint and chemical properties in the alloy weld metal on the cladding side, but such form no part of the present invention.

In order to provide a good circumferential or butt-weld whereby to join the ends of the sections, I use an inert gas shielded non-consumable electrode welding process with a filler rod of the proper chemical analysis, although my method does not exclude other types of welding processes.

The circumferential weld of this invention utilizes a particular bevel design. The tungsten arc welding process is utilized with filler material to seal the cladding surface on the inside diameter of the clad pipe, the filler material being applied from the outside without diluting the deposited weld metal with metal from the base metal layer.

A land 18 of about 1/8" on each pipe section end extends toward the land on the other pipe section, it being understood that the abutting faces 20 of the clad metal layer have been machined so that they will be smooth, and also substantially transverse to the axes of the pipe sections. The pipe section axes are also assumed to be in alignment with each other, but not necessarily so, as there may be occasions where conditions of use would be better served by having the pipe sections out of alignment, as where it is desired to have the completed pipe make a turn.

The base metal layer of backing steel is machined at substantially a 25° angle on each abutting end of the pipe sections, as shown at 22 in Figure 1.

After the lands are formed, the point of juncture, namely corners 28 and 29, of the inclined portion 22 with the lands, is machined or otherwise shaped as shown at 46 so that the juncture is curved on a 1/32 inch radius.

This machining operation may include the machining of the inner portion of the base and the portion of the cladding metal, as shown at 46. A structure similar to that shown in Figures 1 and 3 is shown in Figure 4, but this figure shows the machined portion 46 which is on a radius of 1/32 inch including only the backing material 12. Thus at the place on each pipe section where the inclined wall joins the land there is a radius of 1/32 inch.

As will be noted, the lands 18 consist wholly of the cladding material of the cladding layer 14.

With the pipe sections held in abutting relationship, a sealing bead of weld material 24, using the tungsten arc method with a filler rod composed of metal of the same or substantially the same composition as the cladding layer, is laid in the joint. This may be done without "drawing" any detrimental elements into the weld metal from the backing metal layer 12, the latter of which may be composed of carbon steel.

The balance of the joint may then be filled in by either of two welding procedures. The weld can be completed by using a high alloy weld metal of a composition having non-corrosive properties, at least as high as those of the cladding sheet 14, or a second barrier pass may be deposited over the bead 24 but in either case the final layer 26 preferably of carbon steel is then laid. In this connection it will be noted that the bead 24 flows to the corners 28 and 29, and forms an arc having substantially a 1/32 inch radius.

As noted above the surface or surfaces formed at the corners have been previously machined to a 1/32 inch radius, and the bead 24 which flows to the corners 28 and 29 follows this curvature forming a 1/32 inch radius arc.

Following this second pass, conventional carbon steel electrodes may be used to lay the final layer 26, which completes the weld.

Using the above process prevents any of the outer base metal layer from becoming a part of the weld which joins the lands 18 of the cladding sheets to each other.

It is an important feature of this invention although not entirely essential that the lands be approximately 1/8 inch on each pipe section for all diameters of pipes, and that the faces 22 of Figure 1 and 40 of Figure 3 be laid back on approximately a 25° angle to their land surface for all sizes of pipe section diameters.

Figure 4 shows a structure similar to that in Figure 3, except that in Figure 4 the lands 46 have been thinned down, as by grinding.

The above description and drawings disclose two embodiments of the invention, and specific language has been employed in describing the invention. It will, nevertheless, be understood that no limitations of the scope of the invention are thereby contemplated, and that various alterations and modifications may be made such as would occur to one skilled in the art to which the invention relates.

I claim:

1. The process of uniting the confronting ends of a pair of clad steel pipe sections wherein the outer layer consists of carbon steel base metal and the inner layer consists of a cladding layer of corrosion resisting metal, comprising the steps of forming circumferential lands of at least 1/8" width adjacent the confronting ends of the pipe sections composed entirely of cladding metal, providing inclined circumferential portions in said base metal extending from said lands to the exterior peripheries of said pipe sections, laying a circumferential sealing weld bead from the outside of said sections with a filler rod of metal having a composition substantially the same as the metal of the cladding layer, and partially filling the trough formed by the inclined portions of said pipe sections until the corners formed by the junctures of said inclined portions and said lands have been entirely covered with welding material to seal the layers of base metal from the confronting ends of the cladding layers, and then completing the weld by filling the trough formed by said inclined portions and said sealing bead with welding material of substantially the same composition as that of said base metal, said steps being performed solely from the outside of said pipe sections.

2. The process of uniting the confronting ends of a pair of clad steel pipe sections as defined in claim 1 and forming prior to welding curved surfaces on approximately one thirty-second of an inch radius on said inclined portions of said carbon steel base layers adjacent the junctures of said inclined portions with said lands.

References Cited in the file of this patent

UNITED STATES PATENTS

| | | |
|---|---|---|
| 1,934,065 | Hermanson | Nov. 7, 1933 |
| 2,050,326 | Hopkins | Aug. 11, 1936 |
| 2,158,799 | Larson | May 16, 1939 |
| 2,177,868 | Chapman | Oct. 31, 1939 |
| 2,209,290 | Watts | July 23, 1940 |
| 2,308,307 | Robinson | Jan. 12, 1943 |
| 2,372,712 | Crawford | Apr. 3, 1945 |
| 2,896,811 | Blaser et al. | July 28, 1959 |

OTHER REFERENCES

P. 825 Welding Handbook, 3rd edition, pub., American Welding Society. (Copy in Division 14.)